United States Patent [19]

Hoback et al.

[11] 3,989,580

[45] Nov. 2, 1976

[54] ASSEMBLY FOR MAKING A POWER TRANSMISSION BELT

[75] Inventors: Ronald D. Hoback; Joseph C. Geist, both of Lincoln, Nebr.

[73] Assignee: The Goodyear Tire & Rubber Company, Akron, Ohio

[22] Filed: Mar. 24, 1975

[21] Appl. No.: 561,385

Related U.S. Application Data

[62] Division of Ser. No. 337,056, March 1, 1973, Pat. No. 3,897,291.

[52] U.S. Cl. .............................. 156/443; 74/231 C; 138/121; 138/138; 138/153; 138/174; 156/425; 156/446; 156/472; 156/499; 156/539; 156/556; 156/582; 425/501; 425/517; 425/520

[51] Int. Cl.² ...................... B29H 7/22; B32B 5/22; B32B 25/10

[58] Field of Search ............. 74/231 C, 231 R, 232; 138/121, 138, 174, 153; 100/176; 425/501, 517, 520; 264/167, 250, 275; 156/137–142, 169, 172, 173, 205, 188–190, 443, 446, 472, 425, 499, 539, 556, 582, 433

[56] References Cited
UNITED STATES PATENTS

| | | | |
|---|---|---|---|
| 2,065,180 | 12/1936 | Freedlander | 156/138 |
| 3,068,710 | 12/1962 | Beckadolph et al. | 156/137 |
| 3,250,653 | 5/1966 | Geist et al. | 156/138 |
| 3,418,186 | 12/1968 | Wetzel | 156/140 |
| 3,464,875 | 9/1969 | Brooks et al. | 156/140 X |
| 3,673,883 | 7/1972 | Adams | 156/138 X |

FOREIGN PATENTS OR APPLICATIONS 2,031,310 11/1970 France

*Primary Examiner*—William A. Powell
*Assistant Examiner*—Thomas Bokan
*Attorney, Agent, or Firm*—F. W. Brunner; R. P. Yaist

[57] ABSTRACT

A method and assembly for making a power transmission belt having driving teeth on opposite surfaces thereof and a tensile member embedded therein. The disclosure also relates to a belt made by the method and apparatus. The method includes providing separate toothed belt portions which will form the two halves of the belt, positioning the first belt portion on a grooved mandrel with the teeth of the first portion disposed within the grooves of the mandrel, applying a tensile member over the outer periphery of the non-toothed surface of the first portion, positioning the other belt portion over the tensile member with its toothed surface facing outwardly of the mandrel; aligning the teeth of the second portion in a predetermined position relative to the teeth of the first portion, retaining the configuration of the teeth of the second portion relative to the teeth of the first portion; and curing the belt portions into a molded integral structure with teeth on opposite surfaces and preferably having a wear-resistant facing covering the opposite toothed surfaces. The disclosed assembly includes means such as a grooved mandrel for maintaining the tooth configuration in the first belt portion and a flexible grooved matrix of special construction for maintaining the tooth configuration in the second belt portion.

12 Claims, 17 Drawing Figures

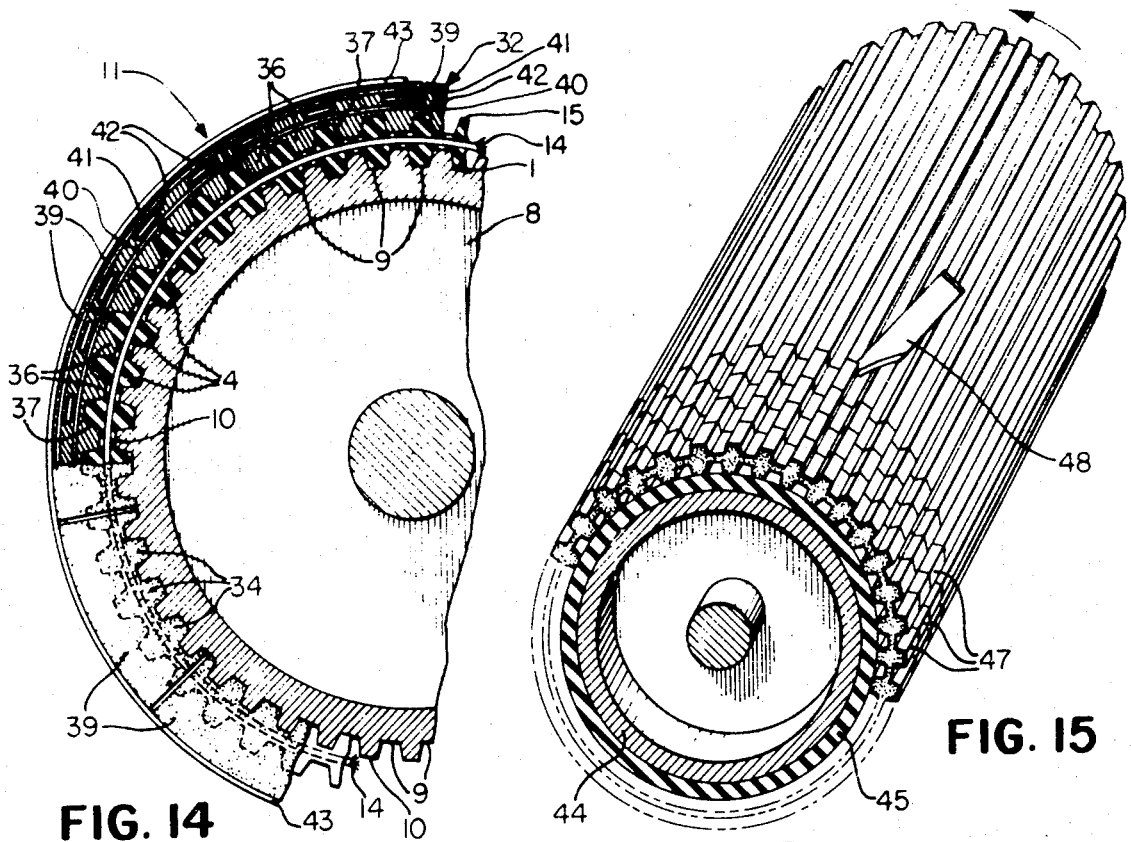
FIG. 14
FIG. 15
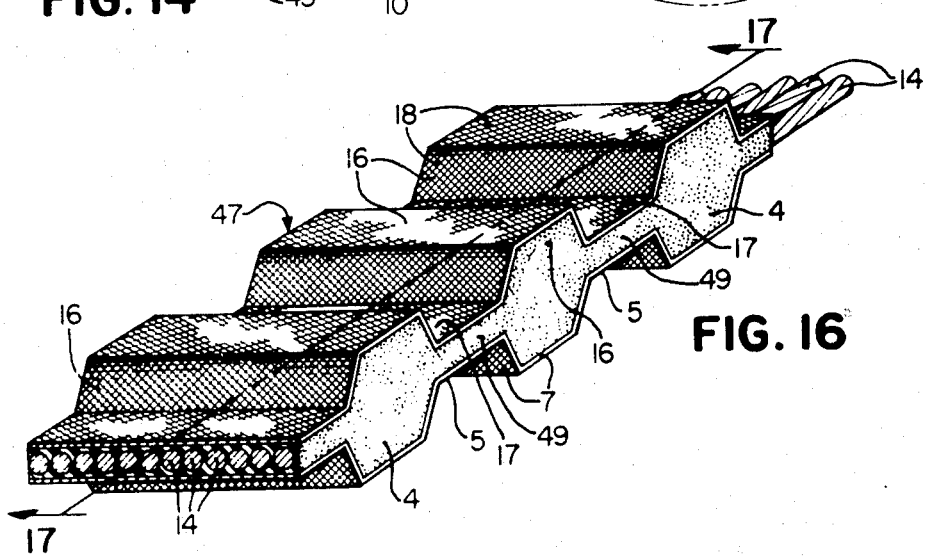
FIG. 16
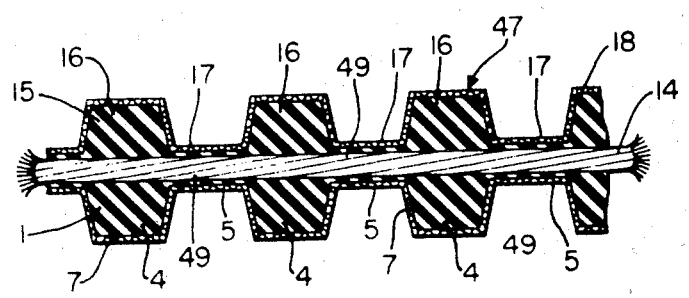
FIG. 17

ASSEMBLY FOR MAKING A POWER TRANSMISSION BELT

This is a Division, of application Ser. No. 337,056 filed Mar. 1, 1973 now U.S. Pat. No. 3,897,291.

BACKGROUND OF THE INVENTION

This invention relates to a method of making a power transmission belt having transversely extending driving teeth on opposite surfaces thereof and to an assembly for making such a belt including a flexible matrix of special construction for forming a toothed portion of the belt. This invention also relates to a power transmission belt having driving teeth on its opposite surfaces manufactured by the method and assembly and more particularly this invention relates to such a belt having a war-resistant facing covering the driving teeth on each opposite surface.

Belts having teeth in opposite surfaces are not new in the art. For example, Waugh U.S. Pat. No. 2,699,685 relates to a V-type transversely grooved power transmission belt having alternating grooves and cogs in opposite surfaces thereof to increase its flexibility in a belt drive. These cogs or teeth, however, do not function to drive the belt so that there is no need that the teeth be precisely formed and positioned as is the case when the teeth serve a driving function as in a timing or gear type belt such as a positive or synchronous drive belt.

Synchronous drive belts having teeth in both driving surfaces also are not new. It has been customary to mold the driving teeth in one surface of such a belt and grind the driving teeth in the opposite surface to achieve an accurate alignment of the teeth in one surface of the belt in relation to the teeth in the opposite surface. This procedure has resulted in a generally satisfactory product but has proven to be costly. This procedure also has an additional disadvantage since it is not practical to provide a wear-resistant facing, for example of a rubber impregnated textile fabric material, covering the surface of the belt to which the driving teeth have been ground or cut.

One problem in making a synchronous drive belt which has teeth molded on its opposite driving surfaces so that a wear-resistant facing can be provided on both surfaces is that it is extremely difficult to align the teeth of one surface in relation to the teeth of the opposite surface and to retain the configuration of the teeth as the belt is being manufactured. Adams U.S. Pat. No. 3,673,883 discloses a method of manufacturing a power transmission belt having driving teeth in each surface with a coating of an elastomeric wear and abrasion-resistant material covering the teeth of each surface. However, this patent does not disclose a method of solving the problem of tooth alignment and retention as discussed above.

OBJECTS OF THE INVENTION

It is therefore a primary object of the present invention to provide an assembly for making a power transmission belt having driving teeth on opposite surfaces of the belt.

It is another primary object of this invention to provide a simple and economical assembly or apparatus for producing such a belt having a wear-resistant facing covering the teeth in both driving surfaces thereof.

It is still another important object of the present invention to provide an assembly for making a power transmission belt having precisely aligned driving teeth on opposite surfaces thereof.

It is a still further object of the present invention to provide an assembly for making a power transmission belt having molded teeth on opposite surfaces thereof with a wear-resistant facing covering the teeth.

It is a more specific object of the present invention to provide a flexible matrix of special construction for the purpose of forming a portion of a toothed transmission belt having teeth on opposite driving surfaces.

Other objects and advantages of this invention will become apparent hereinafter as the description thereof proceeds, the novel features, arrangements and combinations being clearly pointed out in the specification as well as the claims thereunto appended.

It has been found that these foregoing objects are accomplished by a method of making a power transmission belt having transversely extending driving teeth on opposite surfaces thereof and an essentially inextensible tensile member embedded therein with the method comprising:

A. providing separate first and second belt portions of flexible polymeric material with each portion having a plurality of driving teeth on one surface thereof with the teeth extending transversely of the portions;

B. positioning said first portion around a grooved mandrel with the teeth of the first portion disposed within correspondingly aligned grooves in the surface of the mandrel and the opposite surface of the first portion facing outwardly of the mandrel; (C) applying a tensile member around the outer periphery of the opposite surface of the first portion; (D) positioning the second portion around the tensile member with the opposite surface of the second portion in contact with the tensile member and with the teeth of the second portion facing outwardly of the mandrel; (E) aligning the teeth of the second portion in a predetermined position relative to the teeth of the first portion; (F) retaining the configuration of the teeth of the second portion relative to the teeth of the first portion; and (G) curing the first and second portions into a molded integral belt structure having teeth on opposite surfaces thereof and the tensile member embedded therein.

It has also been found that the above objects are accomplished by an assembly for manufacturing such a power transmission belt with the assembly comprising A. first means including grooves for retaining the tooth configuration in the first portion of the belt; (B) second means including grooves for retaining the tooth configuration in the second portion of the belt; and (C) means for positioning the first portion relative to the second portion such that the grooves in the first means are arranged in a predetermined position relative to the grooves in the second means.

These objects are also accomplished by a power transmission belt made in accordance with the method and assembly as described above.

In addition, a specific object of the invention is accomplished by providing a flexible grooved matrix of integral construction for forming a portion of a toothed power transmission belt with the matrix including (A) a generally cylindrical body of flexible polymeric material; (B) reinforcing means including at least one circumferentially disposed reinforcing member embedded in the body; (C) an inwardly facing surface having a plurality of tooth-forming and retaining grooves disposed therein with the grooves extending generally axially of the matrix and having a plurality of lands alternating therewith; and (D) means at each axial end for registering and aligning the matrix grooves with the teeth of a toothed belt portion.

BRIEF DESCRIPTION OF THE DRAWINGS

In the drawings:

FIG. 14 is an enlarged fragmentary view partly in section of the completed assembly of the invention illustrating the completion of the step of the method of the invention shown in FIG. 12;

FIG. 15 is a perspective view of the assembly after cure and removal of the matrix illustrating a final step in the method of the invention in which the finished belts are cut to size;

FIG. 16 is an enlarged fragmentary perspective view of the finished belt of the invention; and FIG. 17 is a section taken on line 17—17 of FIG. 16.

DESCRIPTION OF THE PREFERRED EMBODIMENTS

Figure 1:
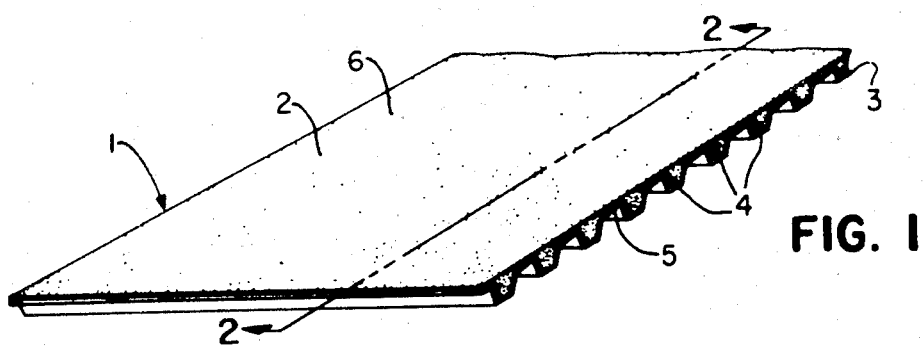
FIG. 1 is a perspective view of a toothed portion of the belt used in the method and assembly of the present invention.
Figure 2:
FIG. 2 is an enlarged sectional view taken on line 2—2 of FIG. 1.

In the drawings, FIGS. 1 and 2 show a first toothed portion 1 of the belt formed at least essentially of a flexible polymeric material which is provided as an initial step in the method of the invention. The belt portion 1 is comprised of a laminated sheet made, for example, of a layer 2 of unvulcanized deformable elastomeric material such as neoprene rubber and a layer 3 of wear-resistant material such as textile fabric. This belt portion 1 will form approximately the bottom or lower one-half of the completed two-sided gear-type driving belt of the invention. It is manufactured by forming the laminated sheet in a flat mold or matrix (not shown) in accordance with the method disclosed in Geist et al U.S. Pat. No. 3,250,653, the revelations of which are incorporated by reference herein.

As best shown in FIG. 2, the formed and shaped belt portion 1 includes a plurality of continuous driving teeth 4 extending in a generally parallel relationship transversely in one surface 5 of the portion. The driving teeth 4 have been formed by tooth-forming grooves contained in one surface of the flat mold which have an opposite configuration to that of the teeth 4. The opposite surface 6 of the portion 1 is generally planar or untoothed. The belt portion 1 includes a wear-resistant facing 7 which results from the layer 3 being applied to the surface 5. The facing 7, for example, is composed of rubber impregnated textile fabric material such as nylon, covering the surface of the driving teeth 5. The elastomeric compound which impregnates the fabric layer 3 is preferably compatible with the layer 2 of elastomeric material. The fabric facing 7 is applied to the belt portion 1 by the method described in U.S. Pat. No. 3,250,653. Preferably, in this first step of the method of the invention the belt portion 1 is performed but not cured or vulcanized to any appreciable degree. The components of the laminated sheet forming the belt portion are joined together by means of the pressure applied during the shaping procedure. As will be hereinafter described, a second toothed belt portion which will define the top or upper half of the belt is formed separately in the same or a similar flat mold or matrix.

Figure 3:
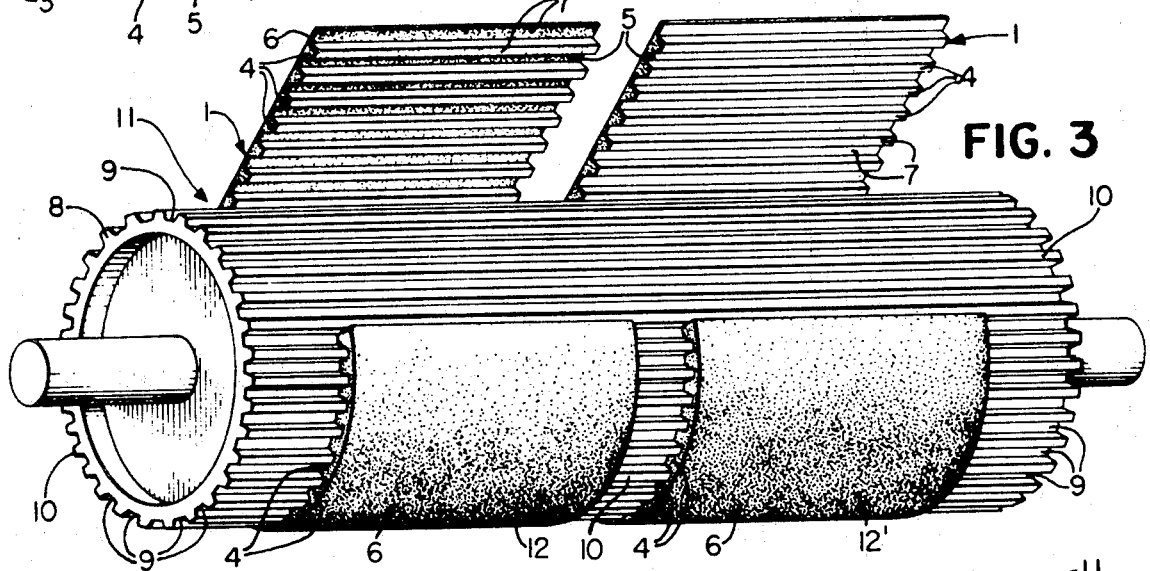
FIG. 3 is a perspective view showing a part of the assembly of the invention in which two sections of the toothed belt portion of FIG. 1 are positioned on a cylindrical mandrel illustrating one step in the method of the invention.

As shown in FIG. 3, the toothed belt portion 1 is next wrapped or positioned around a grooved generally cylindrical mandrel 8 having axially extending continuous grooves 9 in its outer peripheral surface 10. The mandrel grooves 9 have generally the opposite configuration of the teeth 4 of the belt portion 1 so that the teeth 4 are received in the grooves 9 as the belt portion 1 is positioned around the mandrel 8. The mandrel 8 constitutes a component of the belt assembly 11 of the invention and is normally constructed of a rigid metal to provide a means for retaining the tooth configuration in the first belt portion 1 with the teeth 4 of the belt portion registering with or lying in the grooves 9 of the mandrel 8 during all subsequent operations in making the belts of the invention.

After the belt portion 1 is wrapped around the surface 10 of the mandrel 8, the ends of the portion 1 are spliced to form an endless band or sleeve. The belt sleeve 1 has a width less than the width or axial length of the mandrel 8 so that the mandrel grooves 9 at the axial ends of the mandrel are exposed for a reason which will hereinafter become apparent. It is preferred, as shown in FIG. 3, that the belt portion or sleeve 1 be comprised of two separate toothed belt sections 12 and 12' which are applied one at a time around the mandrel 8 with a space being allowed between each section 12 and 12' thereby exposing a portion of the outer peripheral surface 10 of the mandrel between the sections, also for a reason which will be hereinafter apparent.

Figure 4:
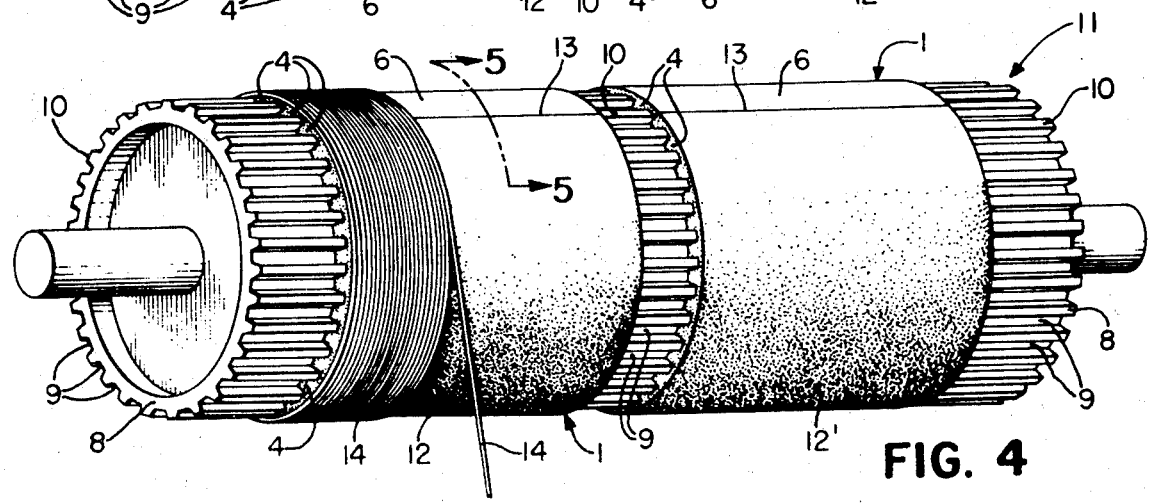
FIG. 4 is a perspective view of a part of the assembly of the invention showing the tension member being applied over the belt sections of FIG. 3 illustrating another step in the method of the invention.
Figure 5:
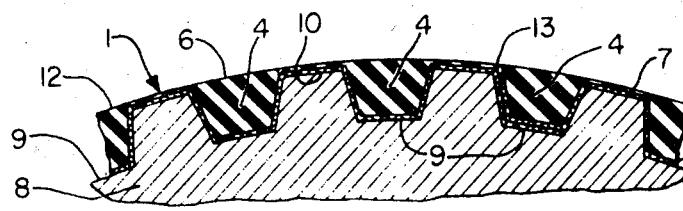
FIG. 5 is an enlarged sectional view taken on line 5—5 of FIG. 4 illustrating how the belt sections of FIG. 3 are formed into endless belt sleeves illustrating another step in the method of the invention.

The completion of this step of the method of the invention is illustrated in FIGS. 4 and 5. It is preferred that the ends of the belt sleeves 1 be lap spliced as most clearly shown in FIG. 5 at 13. An adhesive agent such as a neoprene cement may be used to effect tack in the splice area. It is recommended that a lap splice be used rather than a butt splice since the latter splice might tend to weaken the structure at the splice because the cords in the fabric facing layer 7 would not overlap. A but splice would also make it difficult to hold belt sleeve 1 together during application of tension member 14 in FIG. 4.

FIG. 4 also illustrates the next step of the invention showing a part of the assembly 11 in which the tension layer of the belt is formed by applying a tensile member 14 around the outer periphery of the opposite surface 6 of the sections 12 and 12' of the first portion 1 of the belt. The tensile member 14 may be composed of any of the well-known reinforcing materials well known for that purpose, such as cotton, nylon, rayon, polyester, fiber glass or steel. Preferably, the tensile member is composed of an essentially inextensible synthetic material such as nylon, polyester, or fiber glass cords or a metal cable. The tensile member 14 is helically wound around the mandrel over the outwardly disposed surfaces 6 of the belt sections 12 and 12' by starting at one axial end of the mandrel 8 and rotating the mandrel until the tensile member 14 has been wound over the entire surface 10 of the mandrel save for the exposed portions previously mentioned. A suitable adhesive such as a neoprene cement is usually applied during this step in the belt making procedure by running the tensile member through an apparatus such as an adhesive applicator (not shown) thereby coating the cord or cable. Alternatively, the adhesive can be applied to the tensile member by hand using a brush or other suitable means as the mandrel rotates. Preferably during this operation the adhesive is also applied to the surface 6 of the sections 12 and 12' to promote adhesion between the tensile member 14 and the belt portion 1.

It should be recognized that the method for producing teeth in the first toothed belt portion 1 is very similar to the method of producing a conventional synchronous or positive drive belt of the type having teeth in only one surface. For instance, the method and apparatus or assembly of this invention as described in relation to FIGS. 1 through 5 is very similar to that disclosed in Geist et al U.S. Pat. No. 3,250,653.

After the tensile member 14 has been wound on the mandrel, a second toothed belt portion 15 which has been preformed in the same or a similar manner as the first toothed belt portion 1 is positioned around the mandrel 8 over the tensile member 14. This is done in FIG. 6 which further illustrates the assembly 11 of the invention. This portion 15, as was the first portion 1, is comprised of a flexible polymeric material such as an unvulcanized deformable elastomeric material. The second toothed belt portion 15 intended to form the upper or top half of the completed belt, includes a plurality of continuous driving teeth 16 in one surface 17 thereof extending axially of the portion 15 and also includes a wear-resistant facing 18 for example of textile fabric material covering the outer contour of the teeth 16. The teeth 16 of the second portion 15 may or may not be of the same configuration as the teeth 4 of the first belt portion 1.

The second belt portion 15 is applied around the mandral so that the surface 17 containing the driving teeth 16 faces outwardly of the mandrel 8 and the opposite generally planar untoothed surface 19 of the portion 15 is in contact with the tensile member 14. The surface 19 may be treated with, for example, a solvent wash to increase tack between the tensile member 14 and the portion 15. The ends of the second portion 15 are spliced together to form an endless band or sleeve. The sleeve 15 has a width less than the axial length of the mandrel 8 so that the grooves at the axial ends of the mandrel are exposed as was previously described in relation to belt sleeves 1. It again is preferred that the belt sleeve 15 be provided in at least two belt sections 20 and 20'. The belt sections 20 and 20' of the belt sleeve or portion 15 are positioned over each belt section 12 and 12' of the belt portion 1 so that each overlying section 20 and 20' of the second portion 15 is aligned with each underlying section 12 and 12' of the first portion 1. The belt sections are of substantially equal width so that a portion of the mandrel 8 is exposed both at each axial end of the mandrel and between the belt sections.

Figure 6:
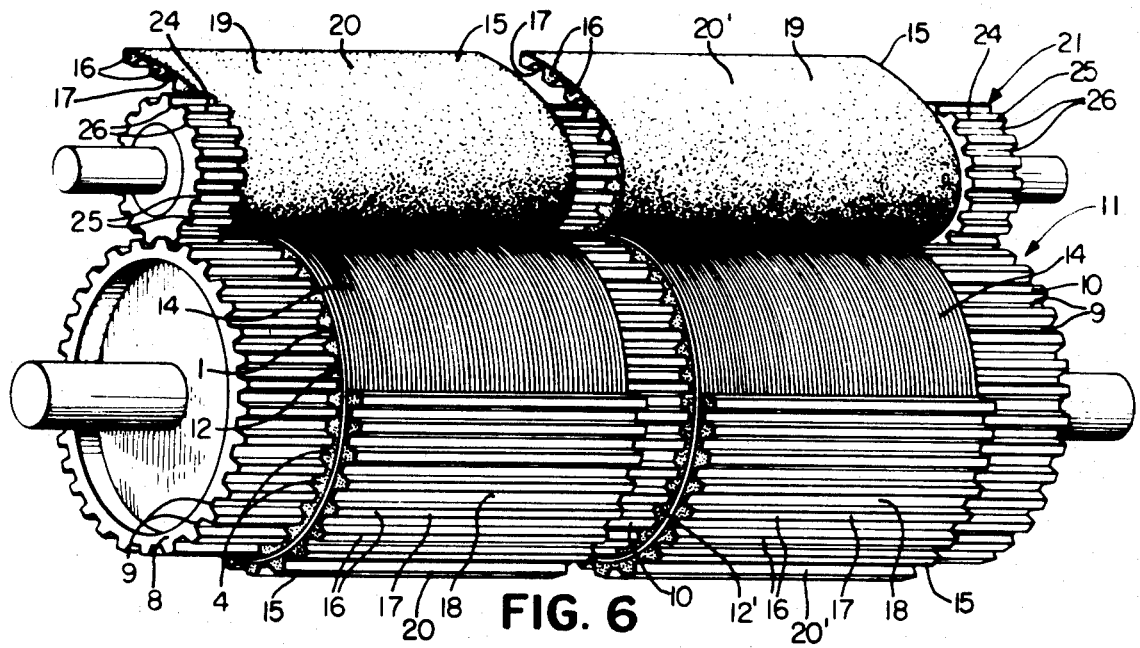
FIG. 6 is a perspective view of the assembly of the invention showing two sections of another toothed belt portion being applied to the belt assembly of FIG. 4 illustrating another step in the method of the invention.
Figure 7:
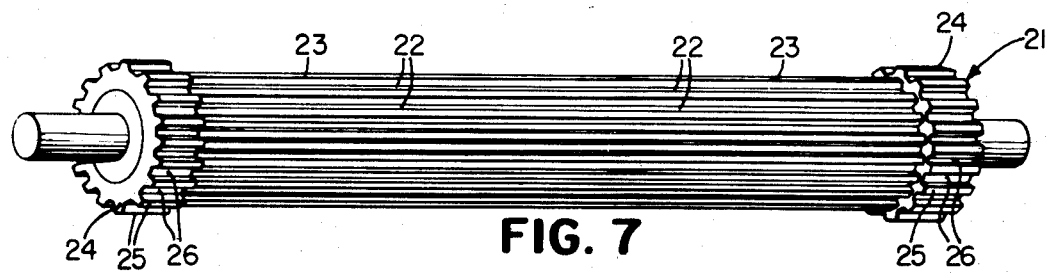
FIG. 7 is a perspective view showing a pressure roller which is a component of the belt assembly of the invention shown in FIG. 6.
Figure 8:
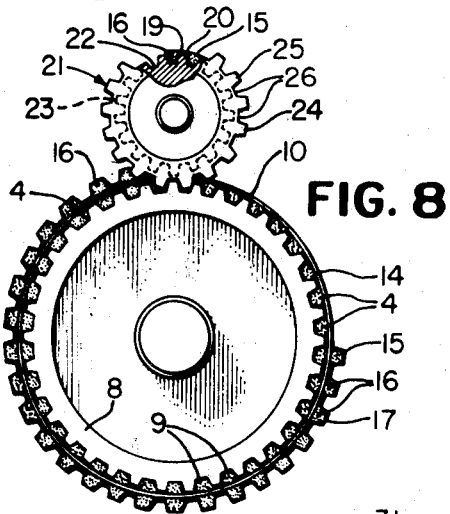
FIG. 8 is a side elevational view of FIG. 6.

The second toothed belt portion may be applied by hand around the mandrel 8 but it is recommended that means such as a pressure roller 21 be used which is associated in some fashion with the mandrel. The pressure roller 21 best seen in FIG. 7 is made of a rigid metallic material such as steel or aluminum and includes a plurality of continuous grooves 22 disposed in its outer peripheral surface 23 extending axially thereof. The roller 21 as shown in FIG. 6 is positioned generally parallel to and above the surface 10 of the mandrel 8 and includes indexing means at each axially opposite end adapted for meshing engagement with the exposed grooves at the axially opposite ends of the mandrel as is most clearly shown in FIG. 8. The indexing means for exampale may be a ring 24 extending radially outwardly from each axial end of the roller 21 with the rings 24 including a plurality of alternating ribs 25 and grooves 26. As the roller 21 rotates about the mandrel 8 the ribs 25 of the ring 24 engage the grooves 9 of the mandrel 8.

The rings 24 may be made as an integral part of the roller 21 and of the same type metallic material, or they may be separate flexible endless elements, for example, constructed of a reinforced vulcanized elastomeric material. In the latter mentioned construction the rings may be constituted by an endless toothed transmission belt of an appropriate width.

As the top portion 15 of the belt is being positioned around the mandrel 8 and over the tensile member 14, the pressure roller 21 exerts pressure downwardly toward the mandrel thereby forcing or squeezing the belt portions 1 and 15 together causing the assembled belt components to adhere to each other and to the mandrel surface 10. In this way the teeth 16 of the top or upper portion 15 are aligned with the teeth 4 of the bottom or lower portion 1.

Figure 9:
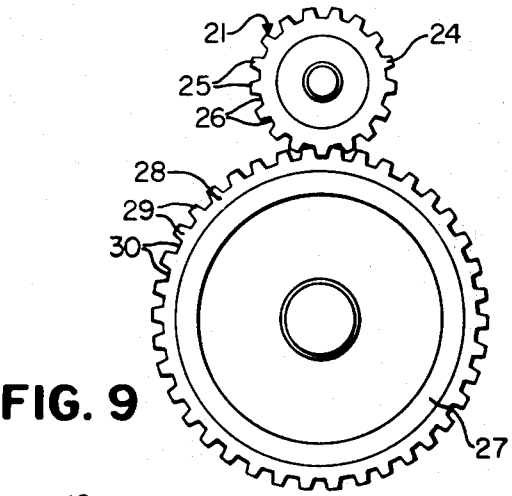
FIG. 9 is a modification of the invention shown in FIG. 8.

In a modified assembly as illustrated in FIG. 9, the mandrel 27 itself may also include a ring element 28 extending radially outwardly from each of its axially opposite ends. The mandrel ring 28 also includes a plurality of alternating ribs 29 and grooves 30 disposed axially of the ring 28 with the ribs 25 of the ring 24 of the roller 21 engaging the grooves 30 of the mandrel ring 28.

Figure 10:
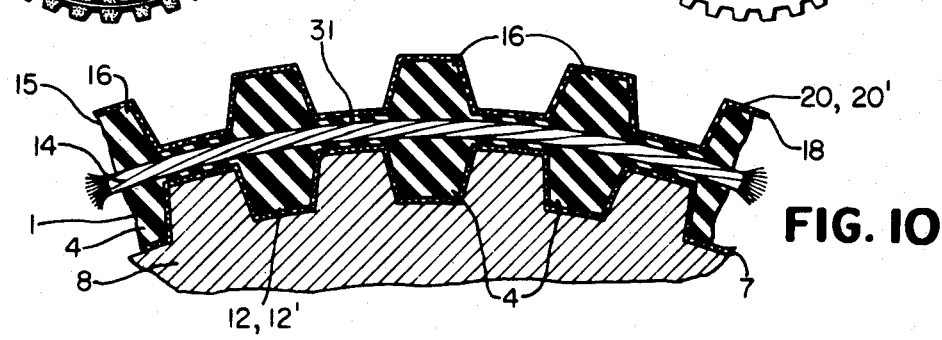
FIG. 10 is an enlarged fragmentary view partly in section of the assembly of the invention illustrating the completion of the steps shown in FIG. 6 and showing how the belt sections of FIG. 6 are formed into endless belt sleeves by means of the pressure roller of FIG. 7.

FIG. 10 illustrates the completion of the step begun in FIG. 6 after the belt sections are formed into endless belt sleeves 1 and 15 by means of the pressure roller 21 of FIG. 7. Preferably, the to or upper sleeve 15 is made endless by means of a butt piece 31 joining the ends of the belt section 20 and 20' of the toothed portion 15.

It should be obvious from the method described to this point that the teeth 16 on the top belt portion 15 can be made in any desired configuration and need not be the same configuration as the teeth 4 in the bottom portion 1. However, for the purpose of illustration, the teeth 16 in the top portion 15 will be of the same configuration (pitch, shape and alignment) as the teeth 4 in the bottom or lower portion 1.

Although it is preferred that the belt components be assembled and vulcanized circumferentially as described in reference to FIGS. 1 through 10, it is also possible to vulcanize the toothed belt portions in a flat condition by using a flat or horizontally disposed mold or matrix. In the latter event the belt portions could be initially applied around a cylindrical mandrel, removed as endless sleeves and then laid up on a flat mold or matrix.

Figure 11:
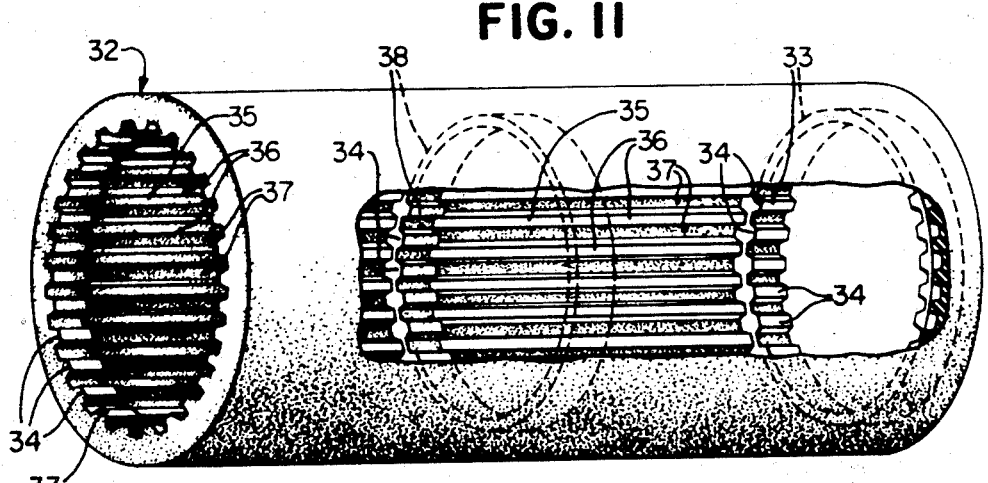
FIG. 11 is a perspective view with parts broken away showing a flexible matrix which is another component of the assembly of the invention.

It becomes important at this point in the practice of the method of the invention to provide means for retaining the tooth configuration of the upper portion 15 as well as maintaining the alignment of these teeth relative to the teeth of the lower belt portion 1. This is accomplished by providing a grooved means such as a flexible grooved matrix 32 as shown in FIG. 11.

The matrix 32 has a generally cylindrical body formed of a vulcanized elastomeric material such as natural or synthetic rubber or other flexible polymeric material and includes outer rows of teeth 33 disposed at each axial end on one inwardly facing surface 35 of the matrix 32 with the teeth 34 of each row 33 extending circumferentially of the matrix 32. The surface 35 of the matrix 32 also includes a plurality of alternating lands 36 and grooves 37 extending generally axially between the outer rows of teeth 33. As shown, the teeth 34 of the outer row 33 protrude radially inwardly beyond the surface 35 of the lands 36. Preferably, at least one inner row 38 of teeth 34 is also provided in the surface 35 of the matrix 32 between the outer rows of teeth 33. The teeth 34 of the inner row 38 extend circumferentially of the matrix parallel to the teeth 34 of the outer rows 33 and face radially inwardly with the teeth 34 of the inner row 38 protruding radially inwardly beyond the surface 35 of the lands 36.

Each individual tooth 34 of row 38 is aligned axially with an individual tooth 34 of row 33 and with a groove 37 extending axially between the teeth 34. The teeth 34 of the matrix 32 act as means for registering and aligning the matrix grooves 37 with the teeth 16 of the tooth belt portion 15 and for that purpose have an opposite configuration to the grooves 9 of the mandrel 8. The grooves 37 of the matrix 32 serve to form and retain the teeth 16 of the second toothed belt portion 15 with which they conform and therefore have an opposite configuration to that of the teeth 16 of the belt portion 15.

Figure 12:
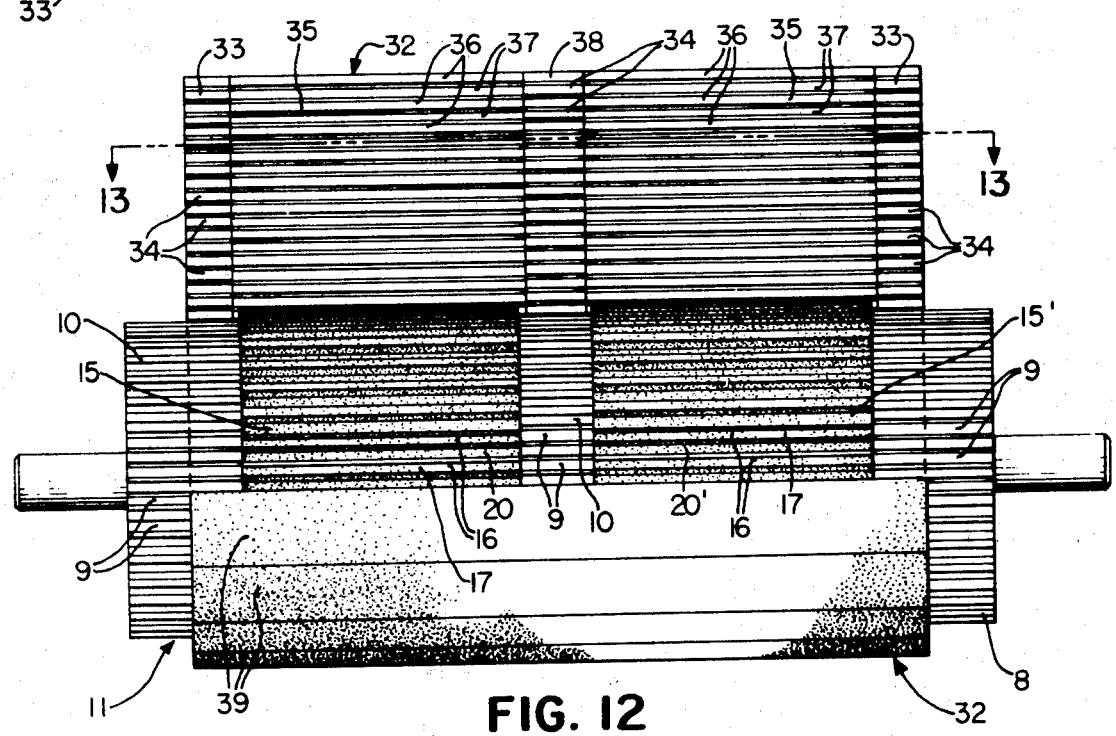
FIG. 12 is a plan view illustrating another stage in the method of the invention in which the flexible matrix of FIG. 11 is applied over the assembly shown in FIG. 10.

In the part of the assembly 11 shown in FIG. 12, the matrix 32 is applied around the mandrel 8 and is disposed over the outer belt portion 15. The matrix 32 as formed has a greater width or axial length than the belt portions 1 and 15 so that when the matrix is applied around the outer peripheral surface 17 of the belt portion 15, the protruding teeth 34 in the outer rows 33 of the matrix sleeve face inwardly of the mandrel 8 and mesh or register with the exposed grooves 9 at the axial ends of the mandrel. Similarly, the protruding teeth 34 of the inner row 38 of the matrix sleeve 32 mesh with the exposed mandrel grooves 9 beteween and adjacent to the belt sections 12, 12' and 20, 20' of the upper and lower belt portions 1 and 15 respectively. The grooves 37 of the matrix sleeve 32 accordingly mesh with the teeth 16 of the second portion 15 which are aligned therewith.

Preferably as best shown in FIGS. 12 and 14, the matrix 32 is comprised of a plurality of separete matrix segments or strips 39 produced by cutting the matrix sleeve 32 parallel to the tooth forming grooves 37. The segments 39 are disposed in a side-by-side relationship overlying substantially the entire outer peripheral surface 10 of the mandrel 8. The reason for this is that a single cylindrical matrix sleeve is difficult to position properly around the belt components on the mandrel. The separate segments 39 enable any slight errors in dimension of the matrix 32 to be compensated for during the disposition of the segments circumferentially around the mandrel 8. Each segment, for example, may be from about two or about four inches wide and may include from about 12 to 15 tooth-forming and retaining grooves 37. As many as 15 segments may be disposed about the mandrel on which the nominal belt length or circumference is approximately 30 inches. Longer belt lengths generally allow use of wider matrix segments.

Figure 13:
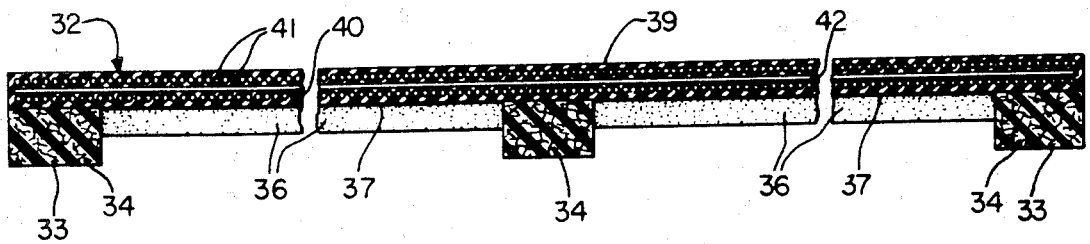
FIG. 13 is an enlarged sectional view taken on line 13—13 of FIG. 12 to better illustrate the construction of the flexible matrix.

The preferred internal construction of the matrix 32 is best shown in FIGS. 13 and 14. The body of the matrix has reinforcing means embedded therein including two layers 40 and 41 of strain-resisting members such as cords or cables of textile fabric, fiber glass, or metal which are circumferentially disposed within the body. Additionally, a plurality of metal strips 42, for example, composed of steel are interposed between the layers 40 and 41 of cords or cables. The strips 42 extend generally axially of the matrix 32 and are placed radially outwardly of and in radially alignment with the lands 36. The teeth 34 of the matrix 32 may be comprised of a fiber-loaded elastomeric material to increase their stiffness or rigidity.

Since the flexible matrix provides means for retaining the tooth configuration in the second portion and since the teeth of the second portion when formed must transmit power in the same manner as the teeth in the lower portion of the belt, both sides of the belt must be held to similar tolerances. Therefore, the construction of the matrix is particularly critical. The matrix must produce a belt having a tooth configuration that will repeatedly match that of the pulleys used with the belt and, consequently, it must maintain precise pitch or spacing of the teeth as well as precise alignment of the teeth on the outer surface of the completed belt with those on the inner surface of the completed belt. Furthermore, the matrix must product near perfect uniformity of web thickness between the teeth in order that the finished transmission belt function properly on a drive. It is also desirable that the matrix be capable of repeated use in the method and assembly used to produce transmission belts having driving teeth on opposite surfaces. It has been determined that the construction as described above will best accomplish all of these results.

The matrix 32 can be produced in various ways. For example, a matrix pattern (not shown) having an opposite configuration to that of the matrix can be made on a cylindrical mold or mandrel of the type used in producing regular conventional positive drive belts having teeth in only one surface by building a heavier than normal positive drive belt and grinding teeth on the back side.

An alternate and preferred method is to make the matrix pattern in a flat mold having grooves of the desired configuration and alignment in the adjacent surfaces of the upper and the lower halves of the mold. It has been found that two plies of unvulcanized deformable elastomeric material such as neoprene rubber laid up with one ply of square-woven fabric between the two plies of elastomeric material is suitable for the matrix pattern. This material is placed between the two halves of the flat mold and then the pattern is formed and vulcanized by placing the loaded mold in a heated press.

In the process for making the matrix, the matrix pattern is wrapped around the cylindrical mold with the ends of the pattern abutting. Two patterns are required per mold and are spaced in the same manner as belt sections 12 and 12'. The pattern preferably should be coated with a mold release agent. Next, a layer of gum stock is wrapped around the mandrel to a suitable thickness, usually approximately 1/16 of an inch, then one or more plies of reinforcing material is woven or cord form can be wrapped around the pattern. The reinforcing material may include nylon stretch-type fabric or a stable non-stretch or non-shrink type synthetic cord or a metallic cable. If reinforcing members such as steel strips are to be included in the construction of the matrix, they may be placed on top of the cord or cable after a first layer of reinforcing material has been wound around the matrix pattern. In this instance, prior to the application of the second cord layer, the strips may be temporarily held in place by rubber stretch bands. A ply of gum stock may then be applied on top of the final cord layer and the plied up mandrel placed in a suitable curing apparatus and cured. After cure, the matrix pattern is removed leaving the matrix. The matrix can then be cut or slit into relatively narrow strips parallel to the tooth-forming grooves. Another possible method of making the matrix as used in the present invention is to place the matrix pattern on a flat mold and then lay up the gum and fabric components in a flat heated press. However, this method is less desirable since the vulcanized matrix sections must fit together to form a cylindrical sleeve and the precise matching of the matrix edges that abut on the mandrel under this condition would be extremely difficult.

The completed assembly of the invention is shown in FIG. 14 with the matrix sleeve segments 39 being held in place on the mandrel 8 and on the first and second toothed portions 1 and 15 by means such as rubber stretch bands 43 or the like.

The assembly 11 of the invention thereby provides means for positioning the first belt portion 1 relative to the second belt portion 15 such that the grooves 9 in the mandrel 8 which provides a first means for retaining the tooth configuration in the first toothed portion 1 of the belt are arranged in a predetermined position relative to the grooves 37 in the flexible matrix 32 which provides a means for retaining the proper tooth configuration in the second portion 15 of the belt.

In the final steps of the invention the entire assembly is placed in a suitable curing apparatus (not shown) and the assembled components are cured into a molded integral belt structure. After curing, the matrix 32 is removed from the mandrel 8. The vulcanized belt sleeve structure as shown in FIG. 15 is also removed from the mandrel 8 and placed onto a cutting mandrel 44 provided with a rubber cutting surface 45. Here the belt sleeve is cut into a plurality of toothed belts 47 of integral construction having the desired dimensions. The cutting is accomplished by means of a knife 48 which is common practice in the art.

The belts 47 as shown in FIGS. 16 and 17 include driving teeth 4 and 16 on opposite surfaces 5 and 17 and an essentially inextensible tensile member 14 embedded within the belt with web sections 49 disposed between each aligned pair of teeth 4 and 16 in the opposite driving surfaces 5 and 17 of the belt 47. A wear or abrasion-resistant fabric facing 7 and 18 surrounds each opposite surface 5 and 17 of the belt 47 covering the driving teeth 4 and 16 in each surface.

It should be apparent to those skilled in the art that the present invention provides a method and assembly for making a power transmission belt having driving teeth on opposite surfaces of the belt and a belt including a wear-resistant facing covering the teeth in both driving surfaces. It should be equally apparent that the present invention provides a method and assembly for making the power transmission belt having precisely aligned driving teeth on opposite surfaces thereof.

While certain representative embodiments and details have been shown for the purpose of illustrating the invention, it will be apparent to those skilled in the art that various changes and modifications may be made therein without departing from the spirit or scope of the invention.

We claim:
1. An assembly for manufacturing a power transmission belt of the type having a first portion having transversely extending driving teeth on one surface thereof, a second portion having transversely extending driving teeth on one surface thereof facing oppositely to the teeth of said first portion, and an inextensible tensile member disposed between said first and second portions, said assembly comprising:
   A. first means including grooves for retaining the tooth configuration in said first portion, said first means including a rigid cylindrical mandrel having a plurality of grooves disposed in its outer peripheral surface extending axially thereof;
   B. second means including grooves for retaining the tooth configuration in said second portion, said second means including a flexible matrix associated with said mandrel, said matrix having a plurality of teeth disposed in outer rows at each axial end thereof with each tooth extending axially on one surface thereof and a plurality of alternating lands and grooves extending axially between said outer rows of teeth and facing inwardly of the mandrel and said teeth protruding radially inwardly beyond the surface of said lands;
   C. means for positioning said first portion relative to said second portion such that the grooves in said first means are arranged in a predetermined position relative to the grooves in said second means.

2. The assembly as claimed in claim 1 wherein the teeth of said matrix have a configuration corresponding at least substantially to the grooves of said mandrel and the teeth of said matrix register with correspondingly aligned grooves of said mandrel at the axial ends of the outer peripheral surface thereof.

3. The assembly as claimed in claim 2 wherein said matrix includes at least one inner row of teeth disposed intermediately of said outer rows with the teeth in the inner row extending axially of the matrix and protruding radially inwardly beyond the surface of said lands, the teeth of the inner row of said matrix register with correspondingly aligned grooves in an exposed portion of the outer peripheral surface of said mandrel.

4. The assembly as claimed in claim 1 wherein said matrix includes at least two layers of strain-resisting members disposed generally circumferentially thereof and a plurality of rigid elements interposed between said members and extending axially of the matrix to provide stiffness and rigidity 5. The assembly as claimed in claim 4 wherein the teeth of said matrix are comprised of a fiber-loaded elastomeric material and said elements are metal strips.

6. The assembly as claimed in claim 4 wherein said matrix is comprised of a plurality of separate matrix segments disposed in a side-by-side relationship overlying substantially the entire outer peripheral surface of said mandrel.

7. The assembly as claimed in claim 1 wherein said means for positioning said first portion relative to said second portion includes means associated with said mandrel for applying pressure to said mandrel to assure a firm bond between said first and second portions and said member.

8. The assembly as claimed in claim 7 wherein said means for applying pressure is a cylindrical roller having a plurality of grooves disposed in its outer peripheral surface extending axially thereof, said roller being positioned generally parallel to said mandrel with said roller provided with indexing means at each axially opposite end thereof adapted for meshing engagement with the grooves of said mandrel in alignment therewith.

9. The assembly as claimed in claim 8 wherein said indexing means is a ring extending radially outwardly from each axial end of said roller, each said ring including a plurality of alternating ribs and grooves with the ribs of said ring engaging the grooves of the mandrel.

10. The assembly as claimed in claim 9 wherein said mandrel also includes a ring extending radially outwardly from each axial end thereof, each said ring including a plurality of alternating ribs and grooves with the ribs of the ring of said roller engaging the grooves of the ring of said mandrel which is in confronting relationship therewith.

11. The assembly as claimed in claim 1 further comprising means for curing said first and second portions into a molded integral belt structure having teeth on opposite surfaces thereof and the member embedded therein and means for holding the matrix on said first and second portions and said mandrel during the curing step.

12. The assembly as claimed in claim 1 wherein said matrix includes a body of flexible polymeric material reinforced by at least one circumferentially disposed strain-resisting member.

* * * * *

UNITED STATES PATENT OFFICE
CERTIFICATE OF CORRECTION

PATENT NO. : 3,989,580
DATED : November 2, 1976
INVENTOR(S) : Ronald D Hoback, Joseph C Geist It is certified that error appears in the above-identified patent and that said Letters Patent are hereby corrected as shown below:

Column 4, line 25, "5" should be -- 4 --.

Column 6, line 36, "exampale" should be -- example --.

Column 9, line 24, "is" should be -- in --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks